US012607165B2

(12) United States Patent
Nixon

(10) Patent No.: US 12,607,165 B2
(45) Date of Patent: Apr. 21, 2026

(54) VENTURI WIND POWER

(71) Applicant: Alan Nixon, Estevan (CA)

(72) Inventor: Alan Nixon, Estevan (CA)

( * ) Notice: Subject to any disclaimer, the term of this patent is extended or adjusted under 35 U.S.C. 154(b) by 0 days.

(21) Appl. No.: 18/935,279

(22) Filed: Nov. 1, 2024

(65) Prior Publication Data

US 2025/0146473 A1 May 8, 2025

(30) Foreign Application Priority Data

Nov. 3, 2023 (CA) ...................................... 3216931

(51) Int. Cl.
*F03D 9/00* (2016.01)

(52) U.S. Cl.
CPC .................................... *F03D 9/008* (2013.01)

(58) Field of Classification Search
CPC ....................................................... F03D 9/008
See application file for complete search history.

(56) References Cited

U.S. PATENT DOCUMENTS

2005/0099011 A1 * 5/2005 Rochester ............... F03B 17/00 290/43
2011/0042956 A1 * 2/2011 Frye ........................ F03B 17/00 290/54

FOREIGN PATENT DOCUMENTS

NL 1005545 C1 * 9/1998 ............... F03D 9/17

* cited by examiner

*Primary Examiner* — Viet P Nguyen
(74) *Attorney, Agent, or Firm* — Nathan V. Woodruff

(57) ABSTRACT

A wind-powered energy generation system has a venturi with an air inlet adapted to receive a wind stream, an air outlet, a restriction between the air inlet and the air outlet, and a fluid port in fluid communication within the restriction. A fluid line is connected to the fluid port such that a low-pressure force generated within the restriction applies a vacuum force to the fluid line. An energy conversion device converts the vacuum force into motive energy.

10 Claims, 9 Drawing Sheets

VENTURI WIND POWER

TECHNICAL FIELD

This relates to a wind-powered energy generation system, and in particular a wind-powered energy generation system that uses a venturi.

BACKGROUND

Given the growing demand for electricity, and a general sustainability requirement, there is a need for innovation in renewable energy. Wind has been used as a source of energy for many generations. The typical mechanism of harnessing this energy is via spinning blades or sail; examples of this include U.S. pregrant pub. no. 20100266412 (Barber) entitled "Wind Power" and U.S. pregrant pub. no. 20040253114 (Gunneskov et al.) entitled "Wind Turbine Blade".

SUMMARY

According to an aspect, there is provided a wind-powered energy generation system comprising a venturi having an air inlet adapted to receive a wind stream, an air outlet, a restriction between the air inlet and the air outlet, and a fluid port in fluid communication within the restriction. A fluid line is connected to the fluid port such that a low-pressure force generated within the restriction applies a vacuum force to the fluid line. An energy conversion device converts the vacuum force into motive energy.

According to other aspects, the wind-powered energy generating system may include one or more of the following aspects, alone or in combination: the fluid line may be connected between the fluid port and a fluid source, the fluid source comprising a source of air or liquid; the fluid line may comprise a siphon line, the siphon line having a liquid inlet in communication with a liquid source and a liquid outlet; the siphon line may be configured such that the vacuum force in the fluid line causes liquid to flow from the liquid source to the liquid outlet; the liquid outlet may be in communication with a liquid reservoir; there may be a plurality of liquid reservoirs at different elevations connected in series by a plurality of siphon lines, such that liquid is moved sequentially between the plurality of liquid reservoirs; the energy conversion device may comprise a liquid turbine, and the liquid reservoir may comprise one or more outlet ports in selective communication with the liquid turbine; the energy conversion device may comprise a vacuum engine, the vacuum engine may have a motive component that is driven by the vacuum force of the fluid line; the vacuum engine may comprises a vacuum regulator that selectively applies the vacuum force to the motive component and a high-pressure reservoir, wherein the motive component is driven by the movement of fluid from the high-pressure reservoir through the fluid line; the vacuum engine may comprises a housing that houses the high-pressure reservoir, the housing comprising a windward air permeable surface on a windward face of the housing that permits air pressure to enter the high-pressure reservoir, and a leeward air impermeable surface on a leeward face that restricts air flow pressure from exiting the housing; and a pivot mount may be provided that permits the housing to orient the windward face and the leeward face.

According to an aspect, there is provided a method of generating energy, comprising: providing a venturi having an air inlet, an air outlet, a restriction between the air inlet and the air outlet, and a fluid port in fluid communication with the restriction; positioning the air inlet in an air stream such that the air stream generates a vacuum force within a fluid line connected to the fluid port; and using the vacuum to drive an energy conversion device that produces motive energy.

According to other aspects, the method may further comprise one or more of the following aspects, alone or in combination: the fluid line may be connected between the fluid port and a fluid source, and the fluid source comprises a source of air or liquid; the fluid line may comprise a siphon line, the siphon line having a liquid inlet in communication with a liquid source and a liquid outlet, and the vacuum force in the fluid line may cause liquid to flow from the liquid source to the liquid outlet; the liquid outlet may be in communication with a liquid reservoir; the liquid reservoir may comprise a plurality of liquid reservoirs at different elevations connected in series by a plurality of siphon lines, such that liquid is moved sequentially between the plurality of liquid reservoirs; the energy conversion device may comprise a liquid turbine, and the liquid reservoir comprises one or more outlet ports in selective communication with the liquid turbine; the energy conversion device may comprise a vacuum engine, and the vacuum force drives a motive component of the vacuum engine; the vacuum engine may comprise a vacuum regulator that selectively applies the vacuum force to the motive component and a high-pressure reservoir, wherein the motive component is driven by the movement of fluid from the high-pressure reservoir through the fluid line; the vacuum engine may comprise a housing that houses the high-pressure reservoir, the housing comprising a windward air permeable surface on a windward face of the housing that permits air pressure to enter the high-pressure reservoir and a leeward air impermeable surface on a leeward face that restricts air flow pressure from exiting the housing; and the method may further comprise the step of pivoting the housing to orient the windward face to face a windward direction of the air stream.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

A venturi wind power system, generally indicated by reference number 100, will now be described with reference to FIG. 1 through 9.

Figure 1:
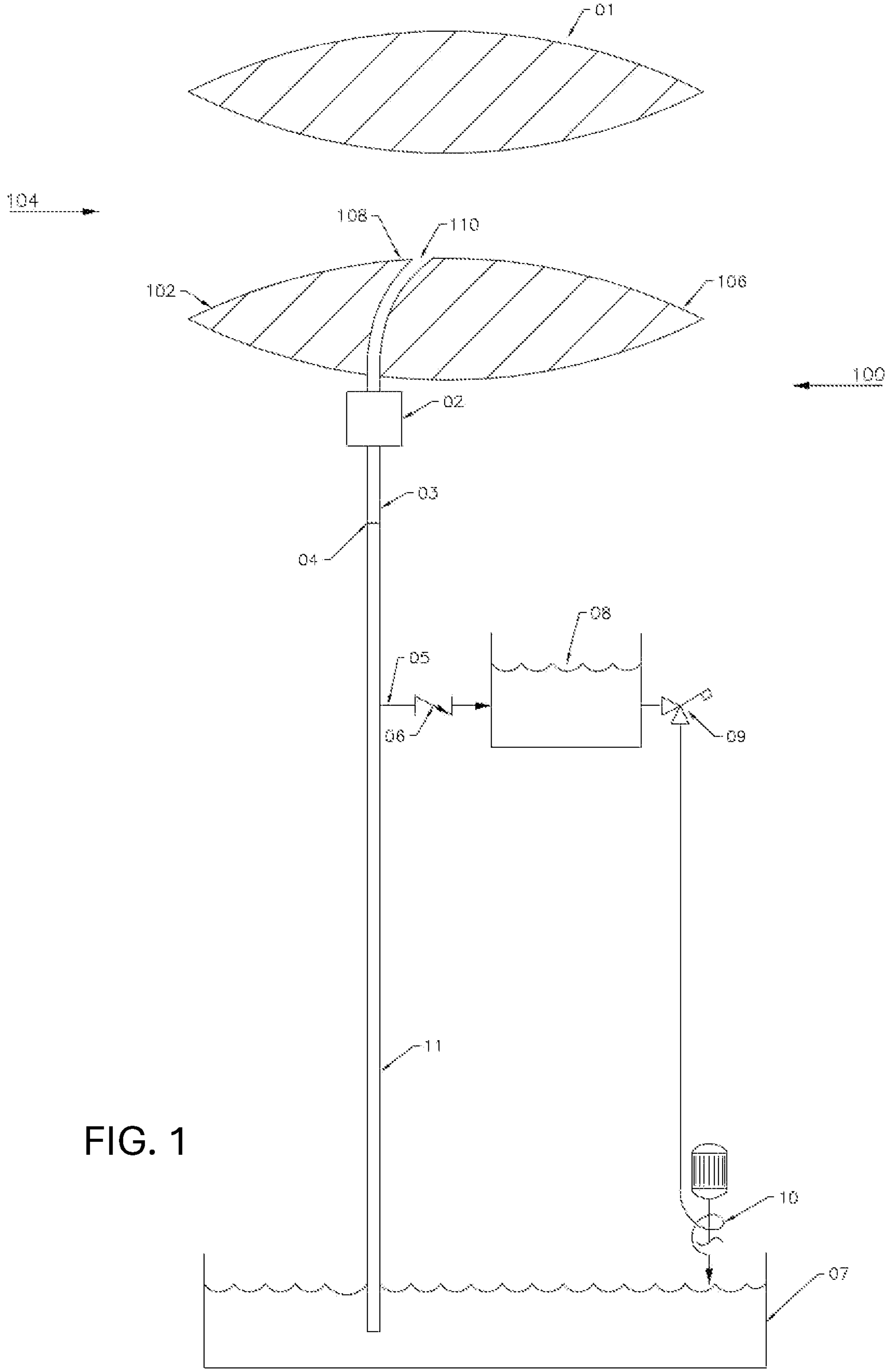
FIG. 1 is a schematic view of a venturi wind power system.
Figure 2:
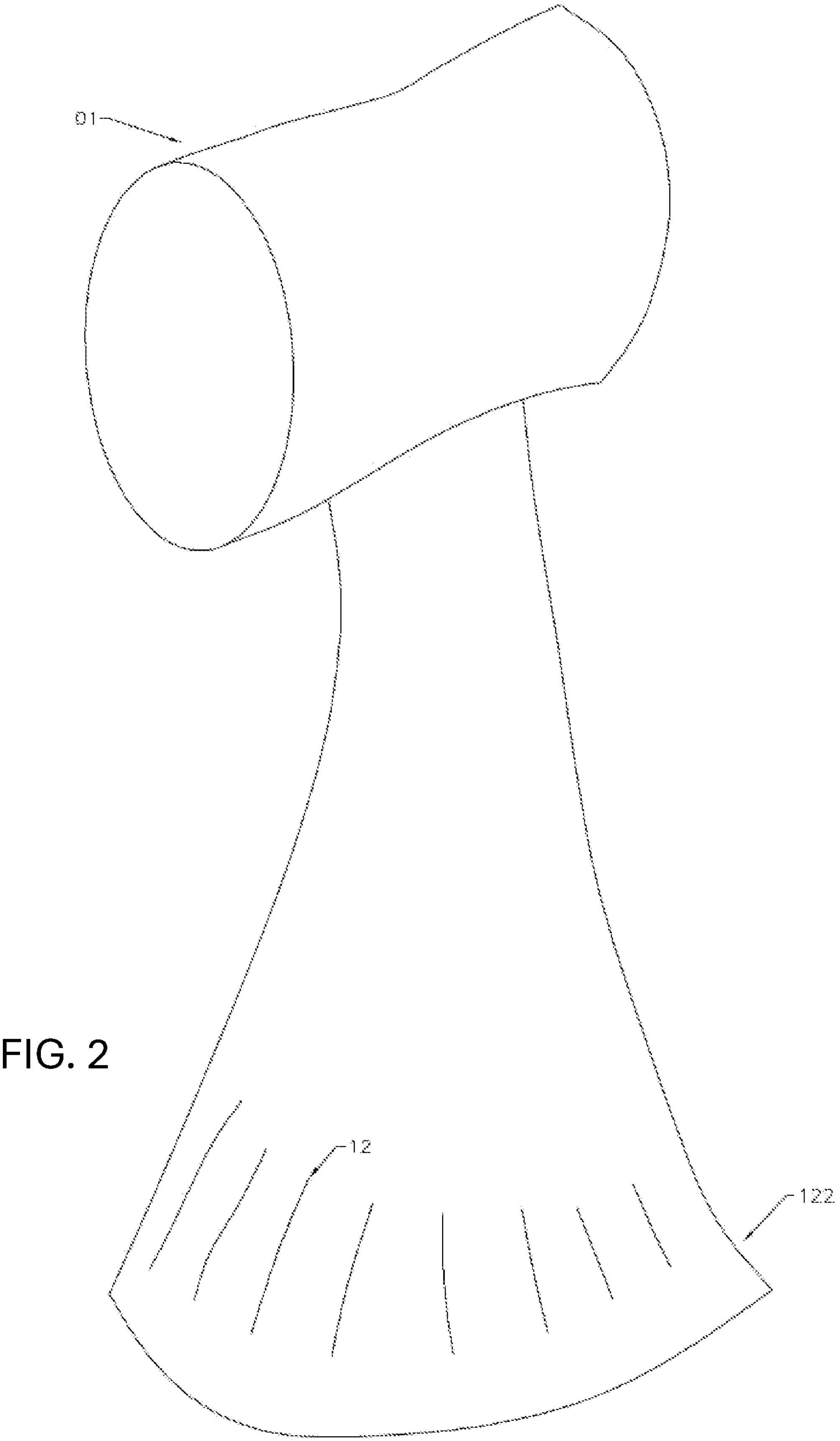
FIG. 2 is a perspective view of a venturi power unit.

Referring to FIG. 1, wind-powered energy generation system 100 has a venturi 101 with an air inlet 102 that is adapted to receive a wind stream 104, an air outlet 106, and a restriction 108 between air inlet 102 and air outlet 106. A fluid line 03 is in fluid communication with restriction 108 via a fluid port 110, which may include a manifold 02. As wind stream 104 passes through venturi 01, a low-pressure force is generated within restriction 108 that applies a vacuum force to fluid line 03 via manifold 02. The vacuum force is then converted into motive energy by an energy conversion device, examples of which will be discussed below. The energy conversion device is generally based on the flow of fluid and may be pneumatic or hydraulic. In the discussion below, the conversion devices will be described in terms of air and water. However, it will be understood that other suitable gases or liquids, depending on the circumstances.

Referring to FIG. 1, the vacuum force may be used to draw liquid, such as water, from a fluid source, such as a low reservoir 07, through water column 11 to a static water level 04. Water in water column 11 flows into a high reservoir 08 via an outlet, which may include a siphon tap 05 and check valve 06 that are positioned below static water level 04. The water flowing from water column 11 represents a source of energy. Where stored in high reservoir 08, the water is a source of potential energy that may be stored for use as required. Water flows from an outlet, which may take the form of an isolation or dump valve 09 through an outflow siphon line 112, that controls the flow of water from high reservoir 08 to water-driven equipment that converts energy, such as a water turbine 10 that converts water pressure into rotational power, which may be used to drive an electrical generator, for example.

Figure 4:
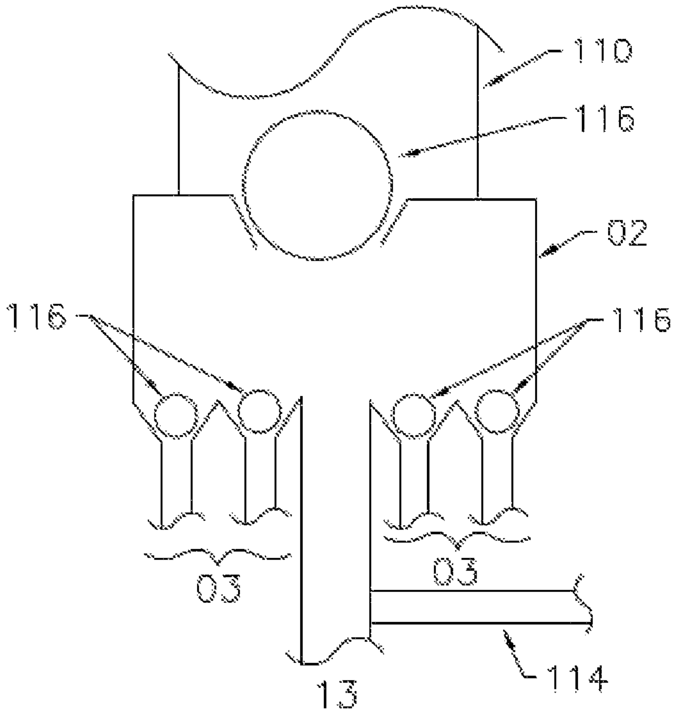
FIG. 4 is a side view in section of a manifold design.

Referring to FIG. 4, an example of a manifold 02 is shown. There is a check valve 116 between fluid port 110 and the manifold 02. The manifold 02 applies the negative pressure to the water column line 03 and the vacuum reservoir 13. Each of the water column lines 03 has check valve 118 between the manifold 02 and the water column line 03.

Figure 8:
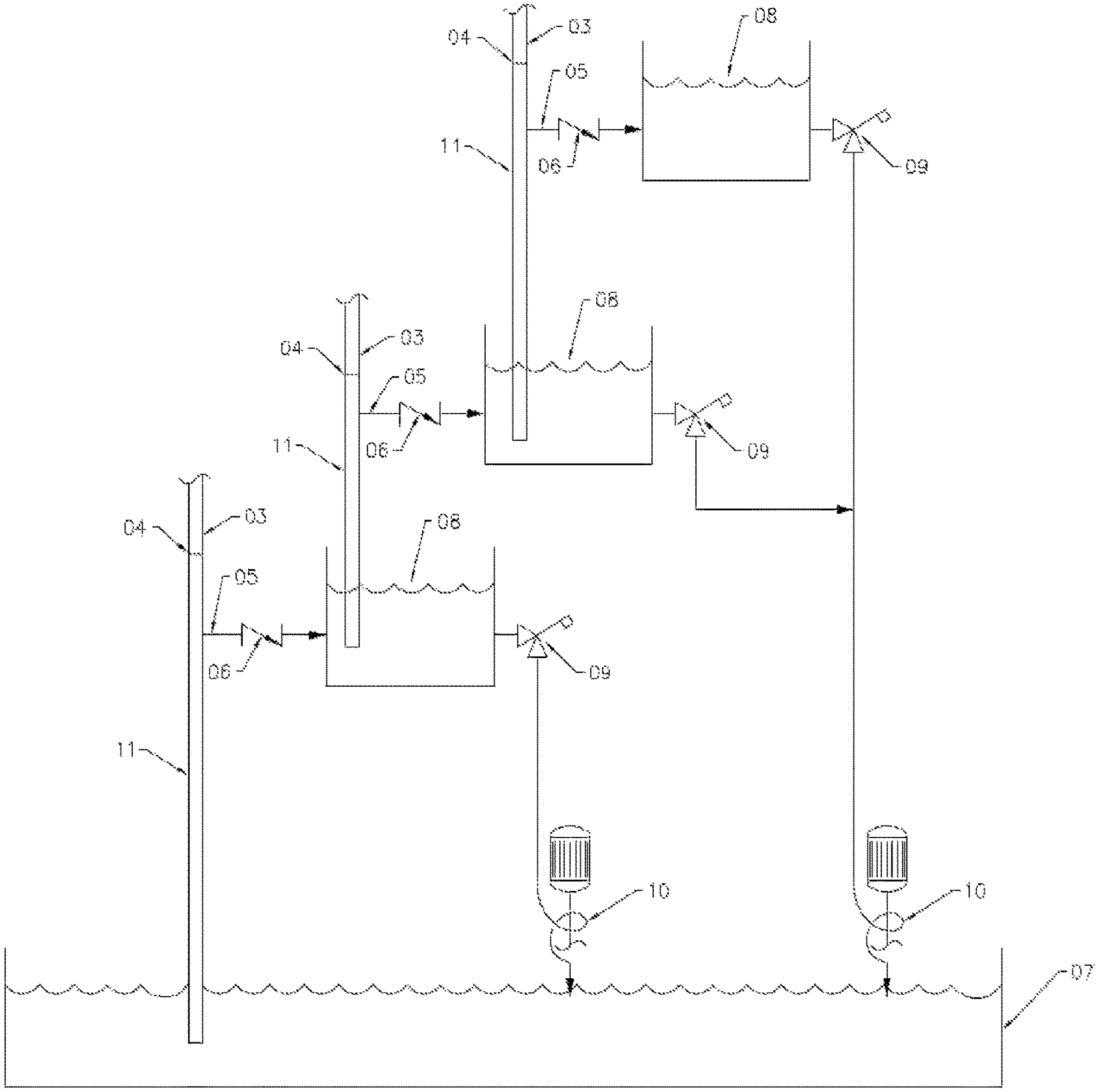
FIG. 8 is a schematic view of a siphon system with a plurality of high reservoirs.
Figure 9:
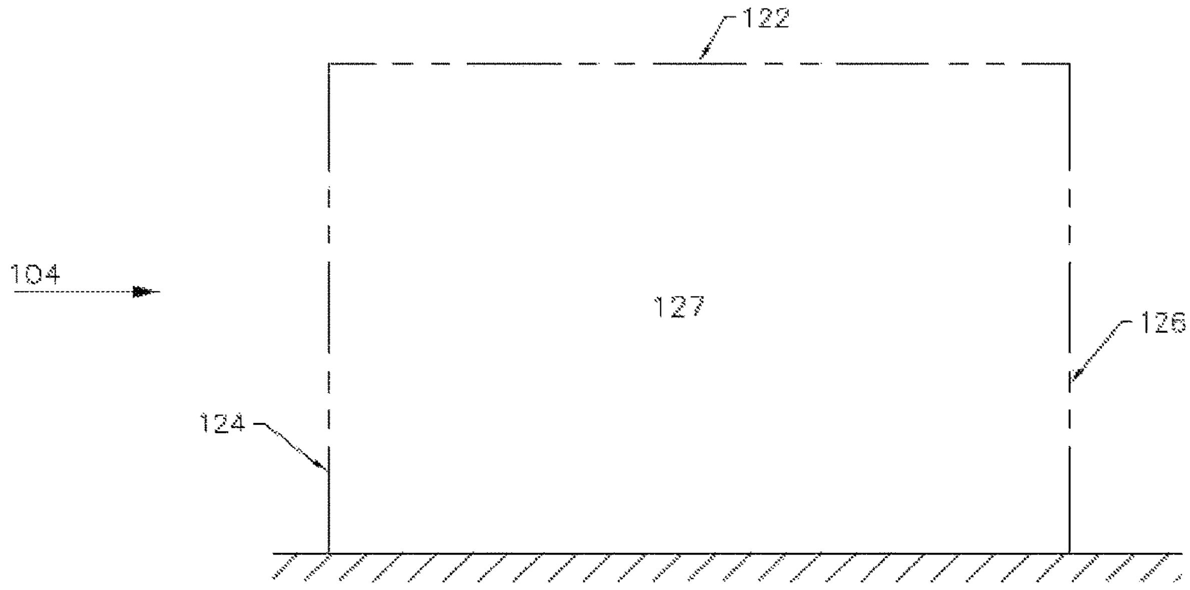
FIG. 9 is a cross-sectional view of housing.

Referring to FIG. 8, there is shown an example that includes more than one high reservoir 08. High reservoirs 08 may be positioned at different elevations and may be connected in series by a plurality of outflow siphon lines 05, each with a dump valve 09. Each siphon line 05 may be connected to a separate water turbine 10 or to different energy conversion devices. In this manner, water may be moved sequentially between the plurality of liquid reservoirs. In other alternatives, two or more siphon lines 05 may run in parallel to different reservoirs 08 or 07, providing different amounts of potential energy to the respective energy conversion devices, or more than one siphon line 05 may be connected to the same water turbine 10.

Figure 5A:
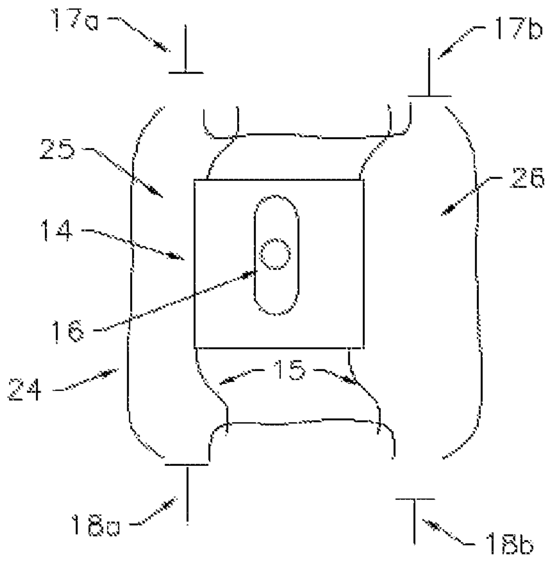
FIG. 5*a* is a side view in section of a first stroke of a diaphragm engine cylinder.
Figure 5B:
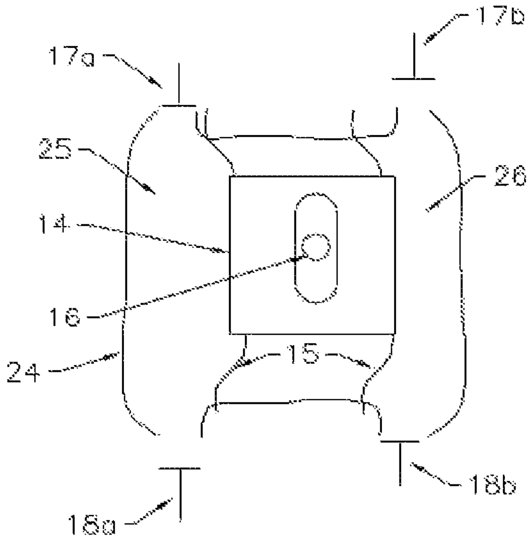
FIG. 5*b* is a side view in section of a second stroke of the diaphragm engine cylinder of FIG. 5*a*.

Referring to FIG. 5A and 5B, the energy conversion device may be a vacuum engine, such as a diaphragm engine 24. Diaphragm pump 24 has a motive component, such as a piston 14 that is driven by the vacuum force of the fluid line. Referring to FIG. 5A, piston 14 is moved to side A 25 by applying vacuum pressure to a first vacuum valve 17*a* and urging piston 14 toward position A 25. Referring to FIG. 5B, vacuum pressure is then applied to a second vacuum valve 17*b*, causing piston 14 to move to side B 26. As piston 14 moves between side A 25 and side B 26, high pressure valves 18*a* and 18*b* are selectively opened to relieve the vacuum pressure and allows piston 14 to move. High pressure valves 18*a* and 18*b* may be connected to any source of air pressure that is higher than the vacuum pressure, such as atmospheric pressure. Sides A and B 25 and 26 may be separately sealed by a diaphragm elastomer 15. As piston 14 moves, it may be used to drive shaft 16, which may be an off-center shaft. Shaft 16 may be designed to convert the movement of piston 14 to reciprocal or rotational movement.

Figure 6:
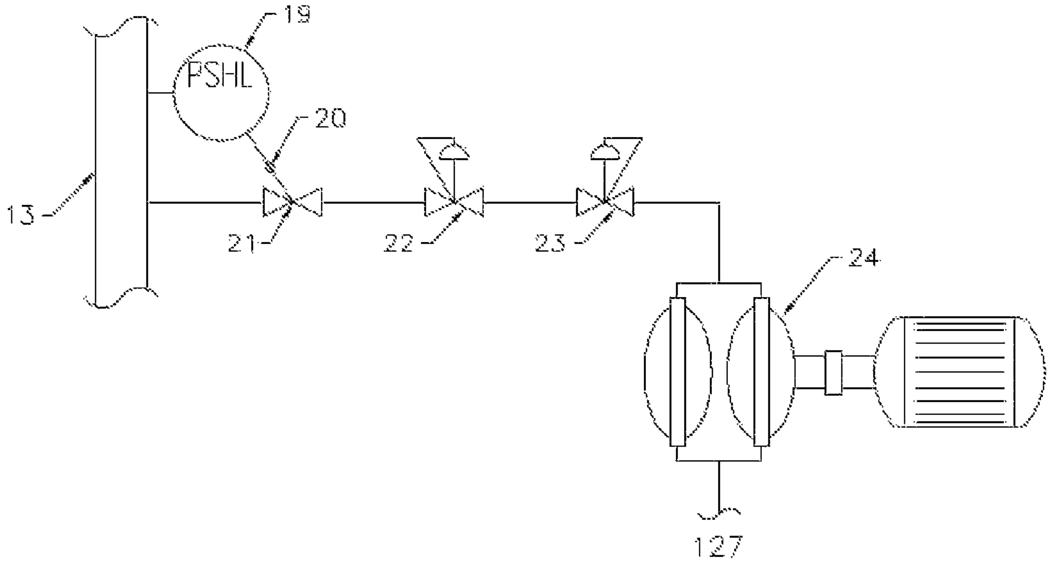
FIG. 6 is a schematic view of the flow control of a diaphragm engine.

Referring to FIG. 6, diaphragm engine 24 may be connected to vacuum reservoir 13 by a vacuum regulator, such as a series of valves, such as an isolation valve 21, a vacuum retention valve 22 and a vacuum control valve 23. Isolation valve 21 may receive a signal input 20 generated by a high/low pressure switch 19. Diaphragm engine 24 may be used to drive an electrical generator 120, or other suitable equipment.

Figure 3A:
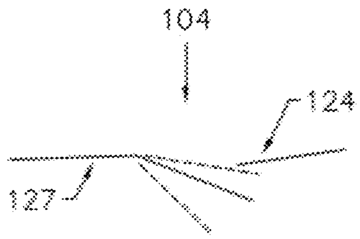
FIGS. 3*a* and 3*b* are cross-sectional views of exterior finishes.
Figure 3B:
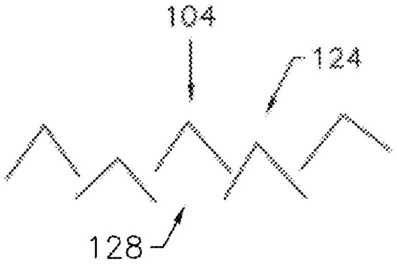

In some examples, the pressure differential used to drive diaphragm engine 24 may be increased by connecting high pressure valves 18*a* and 18*b* to a high-pressure reservoir, which may be defined by a housing 122 that has a windward face 124 and a leeward face 126. Windward face 124 has an exterior finish 12 that causes windward face 124 to be air permeable surface, such that the air flow permits air pressure to enter housing 122, which may be in fluid communication with high pressure valves 18*a* and 18*b*. Referring to FIGS. 3*a* and 3*b*, exterior finish 12 is designed to allow air in, but is prevented from flowing in reverse in order to create an interior positive pressure environment within housing 122.

Housing 122 may be mounted on a swivel or pivot (not shown) that allows housing 122 to be properly oriented with windward face 124 facing the direction from which air flows. Leeward surface 126 may also be air permeable in a manner that restricts air flow pressure from exiting the housing.

Examples of potential implementations will now be described.

Implementations

The idea outlined herein is a wind-powered energy generation system where the Venturi Power Unit 01 is positioned in a wind stream. The Venturi Power Unit will be oriented such that the air inlet side of the unit will be on the windward side of the Venturi Power Unit and the air outlet will be on the leeward side of the Venturi Power Unit. The Venturi Power Unit can be static or have a variable orientation; this orientation can be done actively, via a motor rotating the unit into the proper orientation, or passively, via a wind vane tail. The Venturi Power Unit will have a throat between the air inlet and air outlet where there is a restriction in cross-sectional area such that air velocity is increased. Within the throat there will be at least one fluid port in communication with the restriction such that the low-pressure force generated within the restriction applies a vacuum force to the fluid line, or Vacuum Reservoir 13. This vacuum force is able to be translated in rotational energy via the use of Siphon Power Production or Differential Pressure Power Production This concept is based on the venturi principle wherein velocity increases as cross-sectional decreases, and pressure decreases as velocity increases. This low pressure is communicable to the desired elevation to extract power.

Siphon Power Production

With Siphon Power Production, a siphon line in communication with the Vacuum Reservoir and liquid source, low reservoir 07, wherein the static liquid level 04 in the siphon line is raised above the liquid outlet, siphon tap 05, located at a high reservoir 08. Fluid is stored at higher elevations and release via the use of a dump valve 09 for the potential energy stored in the elevation to be released into rotational or electrical energy via the use of a water turbine.

Given the siphon height limitations in water columns, it is envisioned the high reservoir could be the liquid source for a higher reservoir such liquid can be moved sequentially to higher elevations. Referring to FIG. 4, individual siphon lines may be equipped with check valves to lock a given liquid level and allow fluid to flow from the siphon tap.

Differential Pressure Power Production

Differential Pressure Power Production uses the pressure difference between the Vacuum Reservoir and the High Pressure Reservoir; the High Pressure Reservoir being the at-grade structure housing the vacuum engine. Referring to FIG. 3, it is envisioned that exterior finish 12 of the structure would be configured such that air is able to enter on the windward side and hindered from leaving on the leeward side. The pressure within the structure is assumed to be greater than or equal to ambient pressure.

It is envisioned that a Vacuum Regulator, or Vacuum Control Valve 23 will control that amount of vacuum force applied to a given motive component. The motive component is driven by the movement of fluid from the high-pressure reservoir to the Vacuum Reservoir fluid line; either via direct movement or through piston stroke. Two examples of motive components are the dual action piston and the vacuum turbine.

Dual Action Piston

The Vacuum Reservoir 13 may, or may not, be equipped with a High/Low Pressure Switch 19 that may, or may not, send a signal 20 to the Isolation Valve 21 to gather energy directly from the Vacuum Reservoir. Then there may, or may not, be a Vacuum Retention Valve 22 to maintain a level of vacuum in the Reservoir. Then there may, or may not, be a Vacuum Control Valve to regulate the amount of vacuum that is able to be communicated to the Dual action piston, or Diaphragm Engine 24, or similarly configured engine.

The Dual Action Piston is comprised of one or more cylinders configured in a manner like that shown in FIG. 5. The Dual Action Piston cycle is comprised of two strokes. In the $1^{st}$ stroke, the Vacuum Valve on Side A 17*a* is opened along with the Atmospheric Valve on Side B 18*b*. The resulting differential pressure will cause the Piston 14 to move toward Side A 25. The movement of the Piston will be communicated to the drive shaft via the Off-Center shaft 16 installed in a slot in the Piston. The drive shaft will be mechanically connected to a camshaft that will actuate the valves 17*a*/17*b*/18*a*/18*b* as the engine alternates between the $1^{st}$ and $2^{nd}$ stroke.

In the $2^{nd}$ stroke, the entire process is inversed with the Vacuum Valve on Side B 17*b* being opened along with the Atmospheric Valve on Side A 18*a*. The resulting differential pressure will cause the Piston 14 to move toward Side B 26. The piston may, or may not, be equipped with a Diaphragm Elastomer 15 to retain air within the cylinder.

Vacuum Turbine

Figure 7:
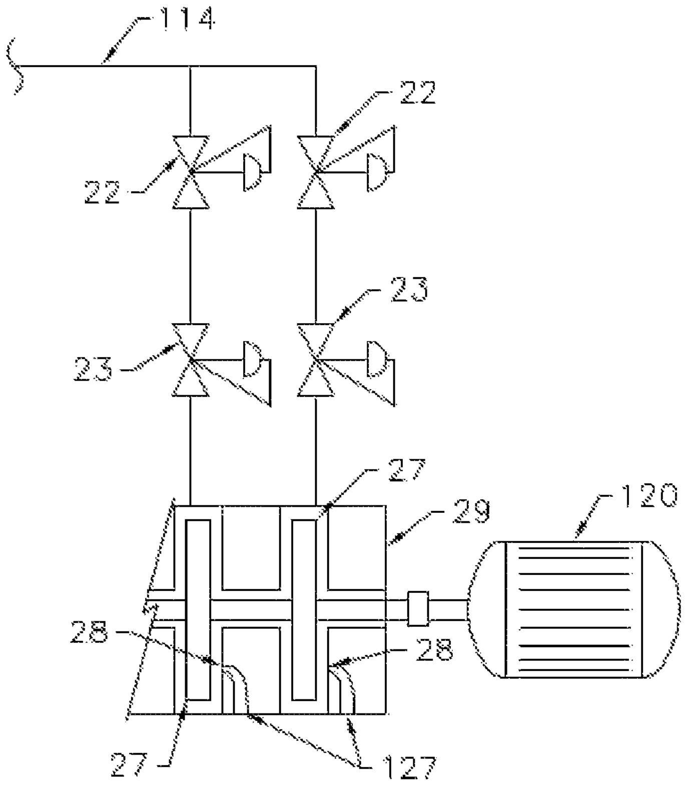
FIG. 7 is a schematic view of a vacuum turbine engine.

Alternatively, a Vacuum Turbine 29, as shown in FIG. 7, could be used. In a typical turbine, a high energy gas is fed into the turbine; the gas force through a nozzle to increase velocity and directed to impeller; most turbines have multiple stages as it takes multiple stages to expend the high energy in the gas and normalize the gas pressure to the ambient pressure it is flowing into.

In Vacuum Turbine, the higher energy gas is at atmospheric pressure, but the 'ambient' pressure is a vacuum. The differential pressure between the two energy states will draw air through the Nozzle 28. The air will increase in velocity and be directed at the impeller 27. Due to the low amount of energy being extracted, the Vacuum Turbine Engine would not be able to sustain multiple stages from a single inlet; however, multiple single stages could be used, as shown in FIG. 7. Each stage would require a Vacuum Retention Valve 22, to ensure there is sufficient vacuum energy to sustain an addition stage, and a Vacuum Control Valve 23 to provide a steady negative pressure.

LIST OF REFERENCE NUMBERS USED IN THE DRAWINGS

01: Venturi Power Unit
02: Manifold
03: Fluid Line
04: Static Water Level
05: Outflow Siphon Tap
06: Check Valve or Backflow Prevention Device
07: Low Reservoir
08: High Reservoir
09: Isolation/Dump Valve
10: Water Turbine
11: Water Column
12: Exterior Finish
13: Vacuum Reservoir
14: Piston
15: Diaphragm Elastomer
16: Off-Center Shaft
17*a*/*b*: Vacuum Valve
18*a*/*b*: Atmospheric Valve
19: High/Low Pressure Switch
20: Unspecified Signal Connection
21: Isolation Valve
22: Vacuum Retention Valve
23: Vacuum Control Valve
24: Diaphragm Engine
25: Diaphragm Cylinder—Side A
26: Diaphragm Cylinder—Side B
27: Turbine Impeller
28: Atmospheric Nozzle
29: Vacuum Turbine Engine
100: Venturi Wind Power System
101: Venturi
102: Air Inlet
104: Wind Stream
106: Air Outlet
108: Restriction or Throat
110: Fluid Port
114: Vacuum Tap
116: Ball & Seat Check Valve
120: Electrical Generator
122: Housing
124: Windward Face
126: Leeward Face
127: Interior of Housing In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A wind-powered energy generation system comprising:
- a venturi having an air inlet adapted to receive a wind stream, an air outlet, a restriction between the air inlet and the air outlet, and a fluid port in fluid communication within the restriction;
- a plurality of liquid reservoirs at different elevations;
- a plurality of siphon lines connected to the fluid port such that a low-pressure force generated within the restriction applies a vacuum force to the plurality of siphon lines, each siphon line having a liquid inlet in communication with a liquid source and a liquid outlet between the liquid inlet and the fluid port such that the vacuum force applied to the siphon line causes liquid to flow from the liquid source to the liquid outlet, wherein the liquid outlet is in communication with a liquid destination, and wherein the liquid source and the liquid outlet are selected from the plurality of liquid reservoirs such that, during use, the plurality of siphon lines moves liquid between the plurality of liquid reservoirs; and
- an energy conversion device that converts a flow of liquid from the liquid outlet into motive energy.

2. The wind-powered energy generating system of claim 1, wherein the energy conversion device comprises a liquid turbine, and the liquid reservoir comprises one or more outlet ports in selective communication with the liquid turbine.

3. A wind-powered energy generating system, comprising:
- a venturi having an air inlet adapted to receive a wind stream, an air outlet, a restriction between the air inlet and the air outlet, and a fluid port in fluid communication within the restriction;
- a fluid line connected to the fluid port such that a low-pressure force generated within the restriction applies a vacuum force to the fluid line; and
- a vacuum engine that converts the vacuum force into motive energy, wherein the vacuum engine comprises:
  - a motive component;
  - a vacuum regulator that selectively applies the vacuum force to the motive component; and
  - a high-pressure reservoir;
  - wherein the motive component is driven by fluid movement from the high-pressure reservoir through the fluid line.

4. The wind-powered energy generating system of claim 3, wherein the vacuum engine comprises a housing that houses the high-pressure reservoir, the housing comprising:
- a windward air permeable surface on a windward face of the housing that permits air pressure to enter the high-pressure reservoir; and a leeward air impermeable surface on a leeward face that restricts air flow pressure from exiting the housing.

5. The wind-powered energy generating system of claim 4, further comprising a pivot mount that permits the housing to orient the windward face and the leeward face.

6. A method of generating energy, comprising:
- providing a venturi having an air inlet, an air outlet, a restriction between the air inlet and the air outlet, and a fluid port in fluid communication with the restriction;
- providing a plurality of liquid reservoirs at different elevations;
- positioning the air inlet in an air stream such that the air stream generates a vacuum force within a plurality of siphon lines connected to the fluid port, each siphon line having a liquid inlet in communication with a liquid source and a liquid outlet between the liquid inlet and the fluid port such that the vacuum force applied to the siphon line causes liquid to flow from the liquid source to the liquid outlet, wherein the liquid outlet is in communication with a liquid destination, and wherein the liquid source and the liquid outlet are selected from the plurality of liquid reservoirs;
- using the vacuum force to cause liquid to flow between the plurality of liquid reservoirs via the plurality of siphon lines; and
- causing a flow of liquid from the liquid outlet to drive an energy conversion device that produces motive energy.

7. The method of claim 6, wherein the energy conversion device comprises a liquid turbine, and the liquid reservoir comprises one or more outlet ports in selective communication with the liquid turbine.

8. A method of generating energy, comprising:
- providing a venturi having an air inlet, an air outlet, a restriction between the air inlet and the air outlet, and a fluid port in fluid communication with the restriction;
- positioning the air inlet in an air stream such that the air stream generates a vacuum force within a fluid line connected to the fluid port;
- driving a vacuum engine using the vacuum force, wherein the vacuum engine comprises:
  - a motive component;
  - a vacuum regulator that selectively applies the vacuum force to the motive component; and
  - a high-pressure reservoir;
  - wherein the motive component is driven by fluid movement from the high-pressure reservoir through the fluid line.

9. The method of claim 8, wherein the vacuum engine comprises a housing that houses the high-pressure reservoir, the housing comprising:
- a windward air permeable surface on a windward face of the housing that permits air pressure to enter the high-pressure reservoir; and
- a leeward air impermeable surface on a leeward face that restricts air flow pressure from exiting the housing.

10. The method of claim 9, further comprising the step of pivoting the housing to orient the windward face to face a windward direction of the air stream.

* * * * *